United States Patent
Mitchell et al.

[11] 3,748,574
[45] July 24, 1973

[54] METHOD FOR DETERMINING THE DISTANCE BETWEEN A CASED AND AN OPEN WELL

[75] Inventors: Forrest R. Mitchell, Metairie, La.; John P. Vogiatzis, Houston, Tex.

[73] Assignee: Shell Oil Company, Houston, Tex.

[22] Filed: Jan. 27, 1972

[21] Appl. No.: 221,368

[52] U.S. Cl.......................................... 324/1, 324/10
[51] Int. Cl.................................................. G01v 3/18
[58] Field of Search.................................... 324/1, 10

[56] References Cited
UNITED STATES PATENTS
3,488,574  1/1970  Tanguy .................................... 324/1
3,697,864  10/1972  Runge ..................................... 324/10

*Primary Examiner*—Gerard R. Strecker
*Attorney*—Theodore E. Bieber et al.

[57] ABSTRACT

A method for determining the distance between a cased well and an open well using resistivity measurements made in the open well using long electrode spacings and a resistivity is calculated from data that is not influenced by the casing in the cased well. A calculation is made of the anticipated reduction in the resistivity measurements caused by the presence of the casing using the calculated resistivity and assuming varying distances between the cased well and the point at which the resistivity is measured. A nomograph is prepared by plotting the calculated reduction versus the assumed distances for each calculated formation resistivity. The measured resistivity is used to determine the actual reduction in the resistivity caused by the casing and the distance between the two wells is then obtained from the nomograph.

8 Claims, 8 Drawing Figures

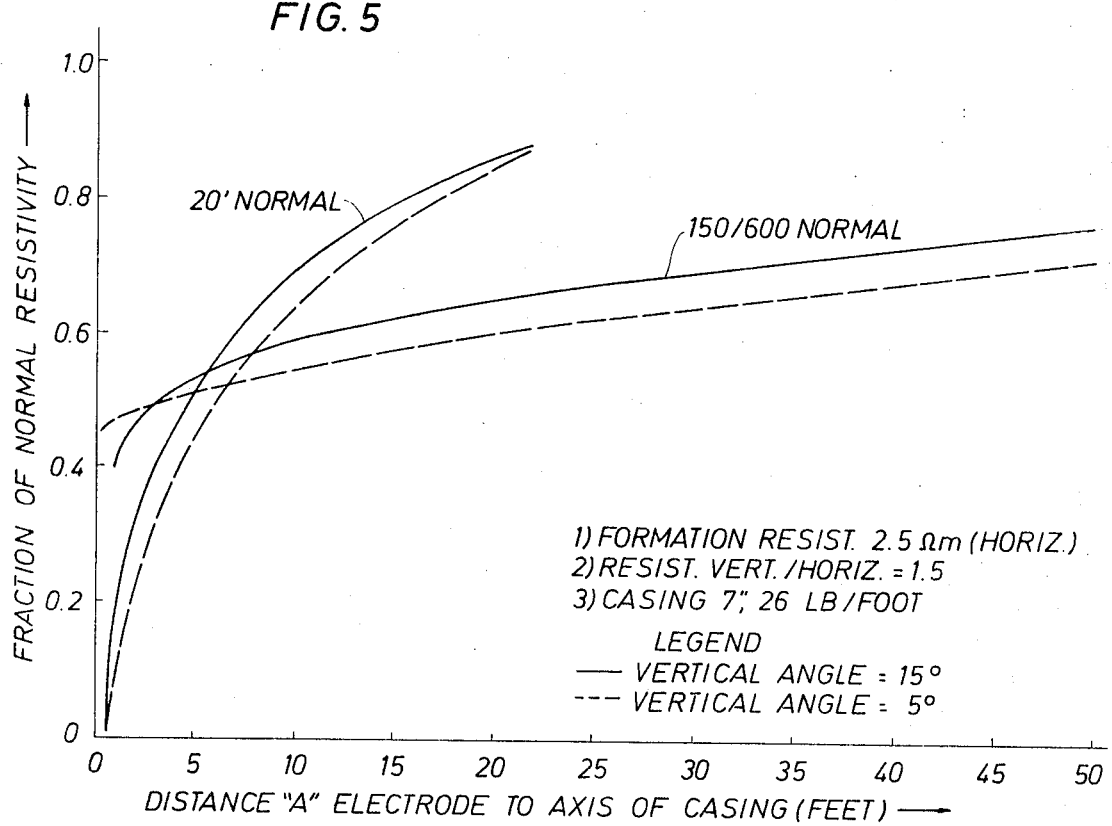
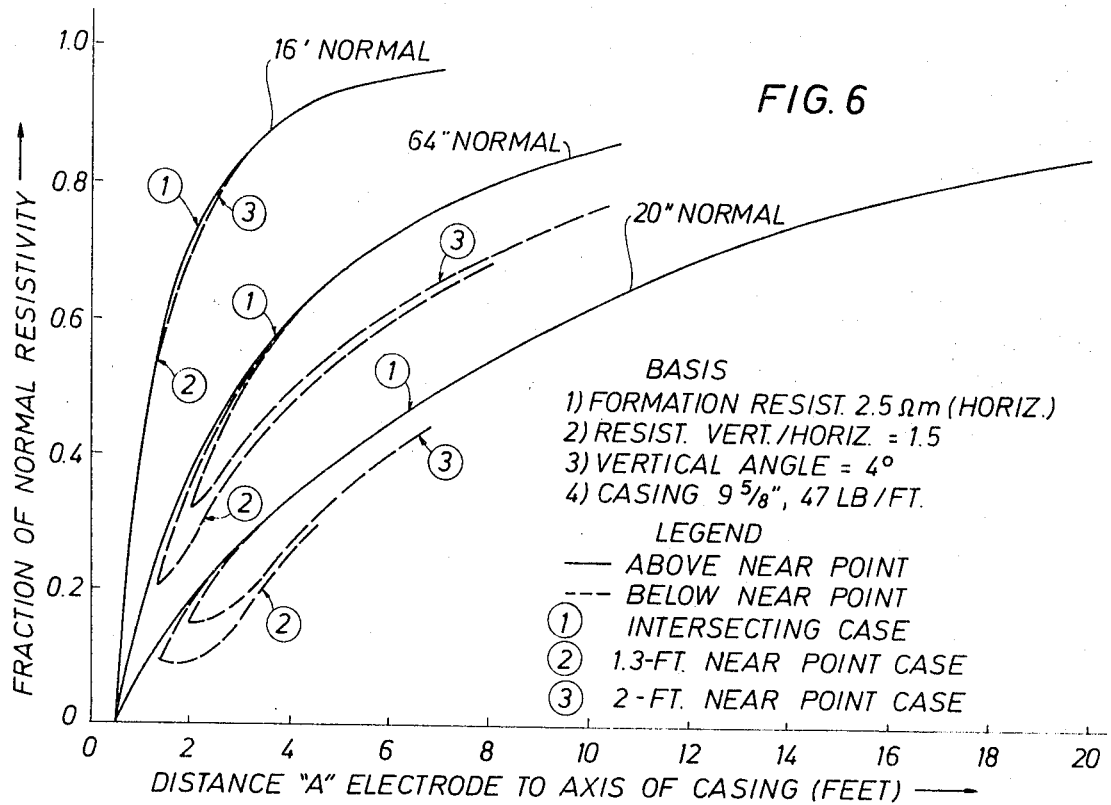

METHOD FOR DETERMINING THE DISTANCE BETWEEN A CASED AND AN OPEN WELL

BACKGROUND OF THE INVENTION

The present invention relates to the drilling of wells and particularly wells that are drilled in the search for hydrocarbon deposits. During the drilling of wells in search of hydrocarbon deposits, it is at times desirable to know the distance between an open well being drilled and a previously drilled cased well. The problem arises in the case of offshore platforms where numerous directional wells are drilled from a single platform. A well being drilled must obviously miss the previously drilled wells. In the past it has been the practice to run directional surveys in each well as it is drilled and depend upon the directional surveys to insure that the wells did not intercept. This procedure has not always been successful since there have been numerous instances where wells being drilled have intersected previously drilled wells on offshore platforms.

The problem also arises when it is desired to drill a directional well to intercept a previously drilled well which has blow out. In this case it is desirable that the directional well intercept the previously drilled well adjacent the bottom so that the formation which is feeding the blowout may be effectively killed.

Further, the problem arises where it is desired to drill a directional relief well to intercept a previously drilled well at a position above its total depth. This occurs when the blowout well is an extremely deep well, for example, in the neighborhood of 20,000 ft., and a relief well would require substantial time and expense.

In this case, if the blowout well can be intercepted at a shallow depth by a directional relief well, a considerable saving in time and expense in killing the blowout can be realized.

SUMMARY OF THE INVENTION

The present invention solves the above problems by providing a method for determining the distance between an open well and a cased well. More particularly, the method utilizes electrical logging information to predict the distance between the two wells. The method consists of first determining the expected or normal resistivity of the formations surrounding the open well. The expected resistivity can be calculated from the resistivity data obtained in the cased well prior to casing or may be calculated from measurements made in the open well using induction type logging devices and short electrode spacings. Also, one can utilize resistivity data obtained from other adjacent wells since the various strata present in the adjacent wells can be identified in the open well. The resistivity of a strata does not change generally to any great extent over the distance between wells. After the expected resistivity is obtained, the actual resistivity is measured using resistivity logging devices having various electrode spacings. Relativiely long electrode spacings are required where the distance between the two wells is large, for example, on the order of 20 feet or more. As the two wells approach each other, resistivity tools having shorter electrode spacings may be used to obtain a more accurate measurement of the distance between the two wells. After the expected or normal and actual resistivities have been obtained, the fraction of normal resistivity (i.e. the reduction in normal resistivity due to the presence of a cased borehole) is deduced and then related to the distance between the wells using calculated data. The reduction in measured resistivity as a result of the presence of the case borehole is calculated using known relationships and plotted in relation to the distance between the cased and the open wells. The calculation takes into account the formation resistivity, the anisotropy of the formation, the angle between the cased and the open well the size, resistivity and weight of the casing and the geometry of the logging tool. One then prepares a series of nomographs for the various combination of conditions that will be encountered in the two wells. The measured reduction in resistivity and nomographs are used to determine the distance between the wells at various depths. The distance is plotted with respect to the depth of the open well to obtain a clear and consistent picture of the path of the open well with respect to the cased well.

BRIEF DESCRIPTION OF THE DRAWINGS

The method of the present invention will be more easily understood from the following detailed description when taken in conjunction with the attached drawings in which:

FIGS. 3–6 are a series of nomographs showing the general variation in the reduction in resistivity due to the presence of various size casing in adjacent wells;

PREFERRED EMBODIMENT

Figure 1:
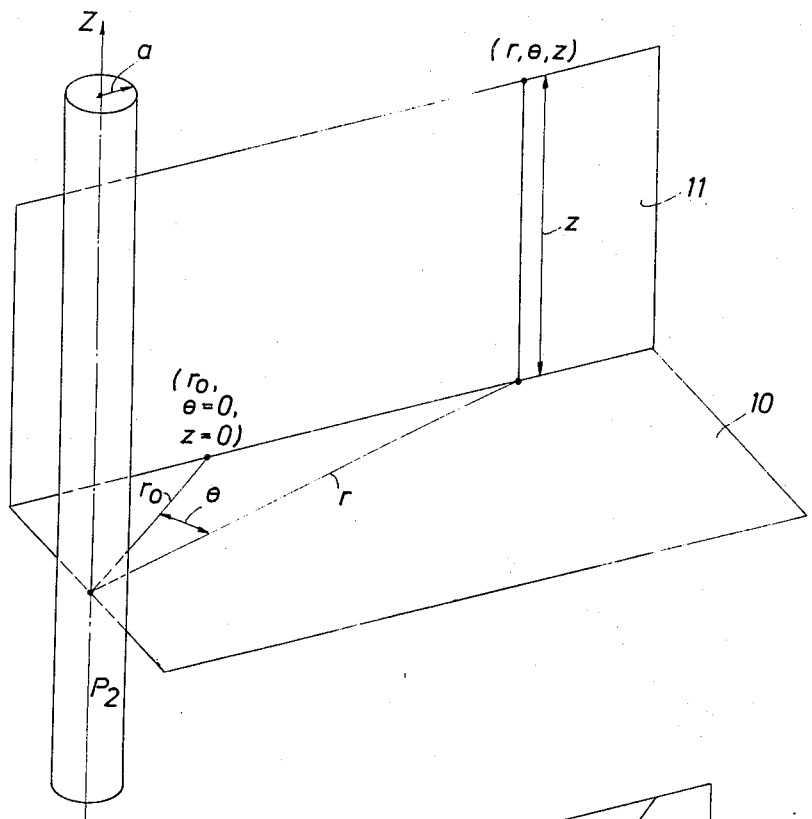
FIG. 1 is a schematic view showing the notation used in calcuating the reduction in resistivity due to the presence of the cased well.
Figure 2:
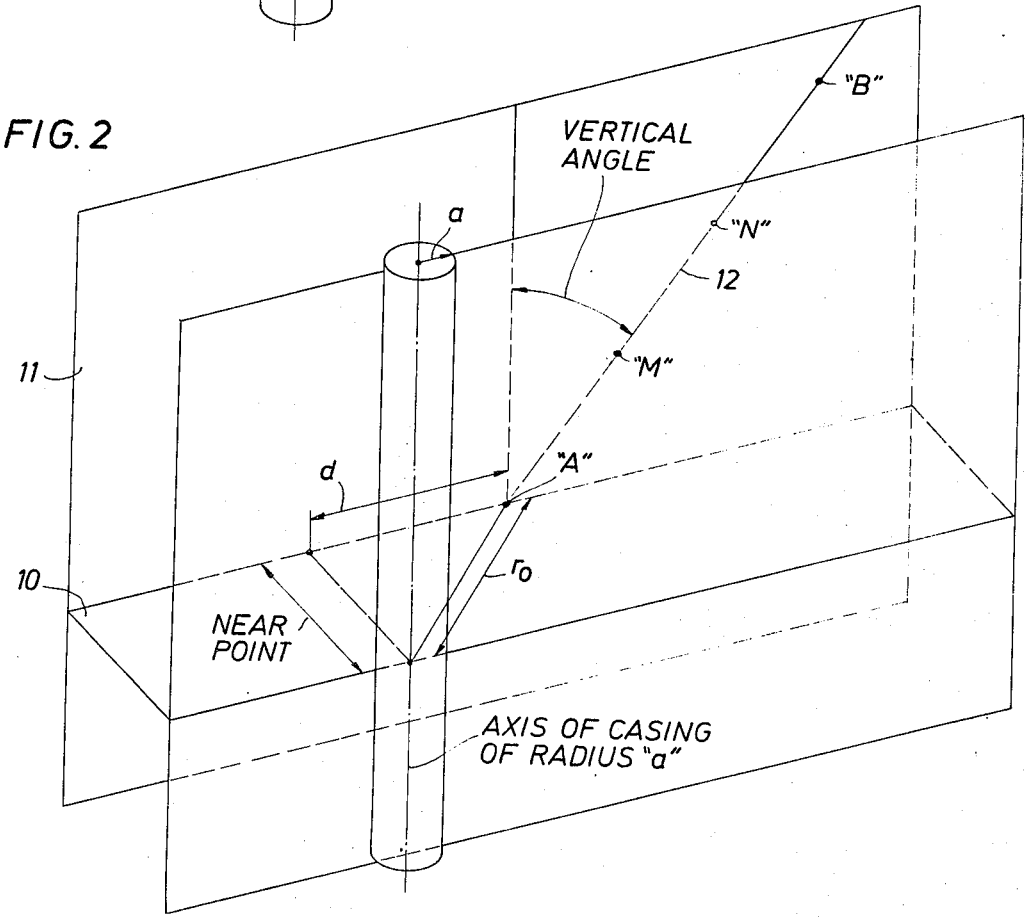
FIG. 2 is a schematic diagram of the logging tool in the open well as related to the cased well.

Referring now to FIGS. 1 and 2, there is shown a nomenclature that is used in the following discussion:

In FIG. 1 there is shown the axis $P_2$ of the casing having a radius "a" and assumed to lie along the vertical axis "Z." A reference point is assumed to lie in the lower plane 10 and having coordinates $r_o$, $\theta = 0$, $Z = 0$ while a point of interest is assumed to lie in a vertical plane 11 at height Z above the reference point 10. The point of interest has coordinates $r$, $\theta$ and $z$. The resistivity is assumed constant in the horizontal plane and vertical direction with their respective values not being the same.

In FIG. 2 there is shown the axis of the casing in relation to the axis 12 of an open well. It is assumed that a resistivity logging tool is disposed in the open well having a common electrode "A" disposed in the plane 10 and two additional electrodes "M" and "N" disposed above the common electrode. Also it is possible that the source electrode "B" may be disposed downhole. If the source electrode "B" is disposed at the surface, the distance between the electrodes "A," "M" and "N" and the source electrode is assumed to be infinite. Also shown in FIG. 2 are the vertical angle as well as the distance "d" and the definition of the near point between the open well and the cased well when the open well is extended to pass the cased well.

Using the above nomenclature, it can be shown that the general solution for the potential distribution around an infintely long conducting cylinder from a point current source can be expressed as follows:

$$\Phi = -\frac{\alpha \rho_h I}{4\pi} \frac{2}{\pi} \sum_{n=0}^{\infty} \epsilon_n \cos n\theta \int_0^{\infty} \frac{K_n(\xi r_0) K_n(\xi r) I_n(\xi a)}{K_n(\xi a)}$$

$$\times \frac{1 - \frac{\rho_2}{\alpha \rho_h} \frac{I_n'(\xi a)}{I_n(\xi a)} \cdot \frac{I_n(\xi a \alpha)}{I_n'(\xi a \alpha)}}{1 - \frac{\rho_2}{\alpha \rho_h} \frac{K_n'(\xi a)}{K_n(\xi a)} \cdot \frac{I_n(\xi a \alpha)}{I_n'(\xi a \alpha)}} \cos \xi \alpha z \, d\xi$$

$$+ \frac{\alpha \rho_h I}{4\pi \sqrt{r^2 + r_0^2 - 2rr_0 \cos\theta - \alpha^2 z^2}},$$

In the above equation, the terms have the following meaning:

$\epsilon_0 = 1$ and $\epsilon_n = 2$ for $n \geq 1$
$\alpha = (\rho v/\rho h)$
$\rho v$ = vertical resistivity of formation
$\rho h$ = horizontal resistivity of formation
$\rho 2$ = effective resistivity of casing assuming it to be a solid cylinder of radius a
$K_n$ and $I_n$ are modified Bessel formation of n order
$\xi$ is the variable of integration The formation resistivity measured at point "A" can be calculated from the following relationship:

$$\rho_A = (\Phi_m - \Phi_n) \, 4\pi/I(1/R_{am} - 1/R_{an})$$

where
$I$ = current flow
$R_{AM}$ = distance AM
$R_{AN}$ = distance AN

The formation resistivity measured at point "A" in the absence of the cased well is:

$$\rho_a = \sqrt{\rho h \, \rho v}$$

The above equations can be programed by one skilled in the art and evaluated for a number of points. The following is the result of an evaluation for one assumed set of conditions:

FRACTIONAL REDUCTION OF RESISTIVITY MEASURED WITH 16-INCH, 64-INCH, AND 20-FOOT NORMAL LOGGING TOOLS IN PROXIMITY TO 9 ⅝-INCH CASING

Conditions:

Formation resistivity: $\rho_h = 2.5$ ohm-meters, $\rho_v/\rho_h = 1.5$

Ratio of effective casing resistivity to $\rho_h$: $\rho P2/\rho_h = 0.196 = 10^{-4}$ Near point: 2 feet

| Distance axis of casing to A electrode $r_0$ (ft) | Distance from near point to A electrode $d$ (ft) | Fractional reduction of resistivity calculated for | | |
|---|---|---|---|---|
| | | 16-inch Tool | 64-inch Tool | 20-foot Tool |
| 10.198 | 10 | | 0.851 | 0.629 |
| 8.246 | 8 | | 0.806 | |
| 7.280 | 7 | | | 0.514 |
| 6.325 | 6 | | 0.738 | |
| 5.385 | 5 | 0.939 | | 0.417 |
| 4.472 | 4 | 0.915 | 0.632 | |
| 3.605 | 3 | 0.879 | | 0.304 |
| 2.828 | 2 | 0.823 | 0.468 | |
| 2.236 | 1 | 0.748 | 0.380 | 0.191 |
| 2.062 | 0.5 | 0.716 | | |
| 2.000 | 0 | 0.702 | 0.324 | 0.155 |
| 2.062 | -0.5 | 0.712 | | |
| 2.236 | -1 | 0.743 | 0.334 | 0.148 |
| 2.828 | -2 | 0.820 | 0.393 | |
| 3.605 | -3 | 0.878 | | 0.228 |
| 4.472 | -4 | | 0.526 | |
| 5.385 | -5 | | | 0.361 |
| 6.325 | -6 | | 0.624 | |
| 7.280 | -7 | | | 0.473 |
| 8.246 | -8 | | 0.702 | |
| 10.198 | -10 | | 0.765 | |

Figure 3:
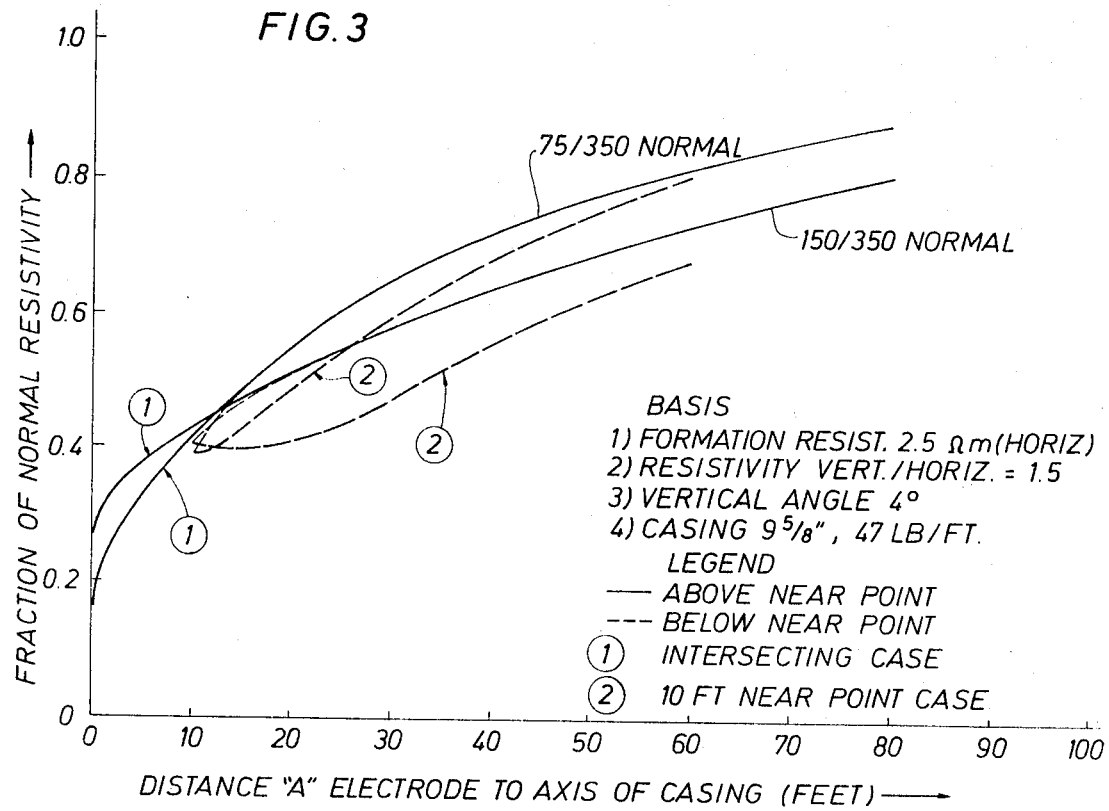
Figure 4:
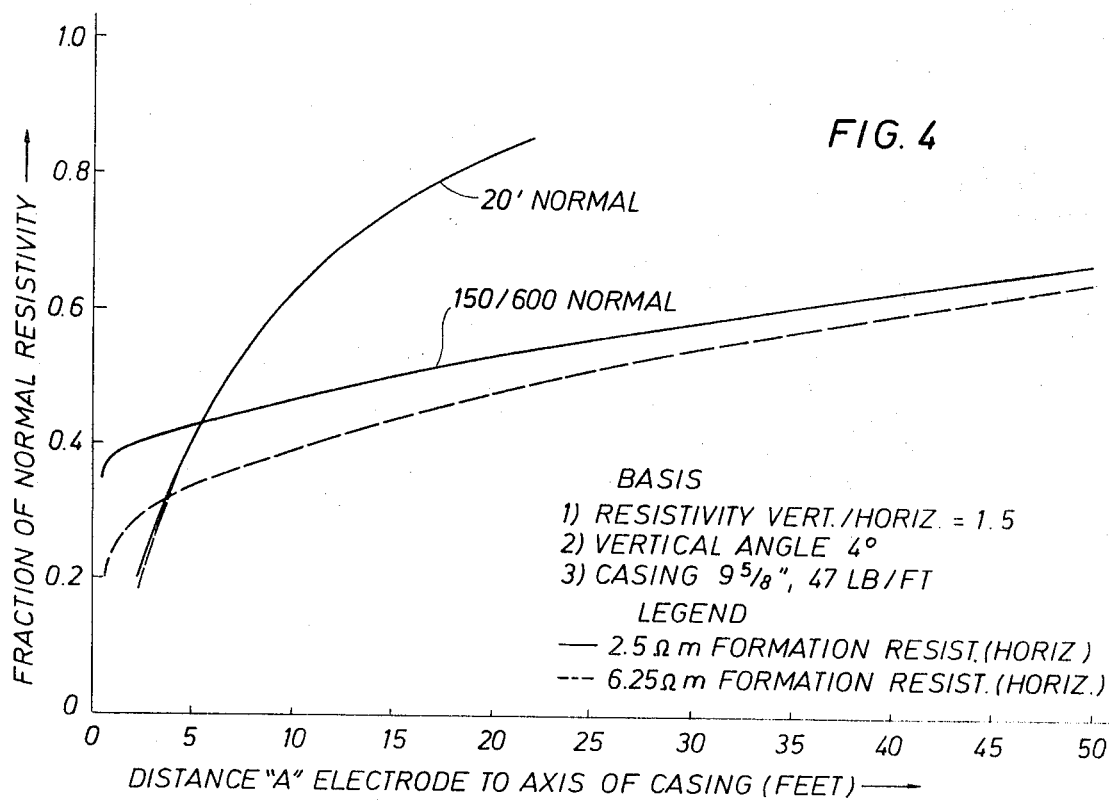

With the above data one can plot a series of nomographs as shown in FIG. 6. Additional nomographs are shown in FIGS. 3–5 for different assumed conditions. The notation 16 inches, 64 inches and 20 ft. normal shown on some of the nomographs refers to a logging tool where the distance between the common electrode A and the closest electrode M is 16 inches, 64 inches and 20 ft., respectively. The nomenclature 75/350 refers to an ultralong spaced resistivity tool where the distance between the common electrode and the near electrode is 75 ft. between the common and the far electrode is 350 ft. While only a few representative nomographs were shown, ovbiously additional nomographs can be prepared for the specific data that applies to a particular set of wells.

FIGS. 3 and 6 also illustrate the effect of the open well approaching the cased well to various near points and then deviating. As shown, once the near point is passed, the curve does not retrace the shape of the original curve but rather has a lower value.

FIGS. 4 and 5 illustrate the effect of a change in the formation resistivity and a change in the vertical angle respectively.

Figure 7:
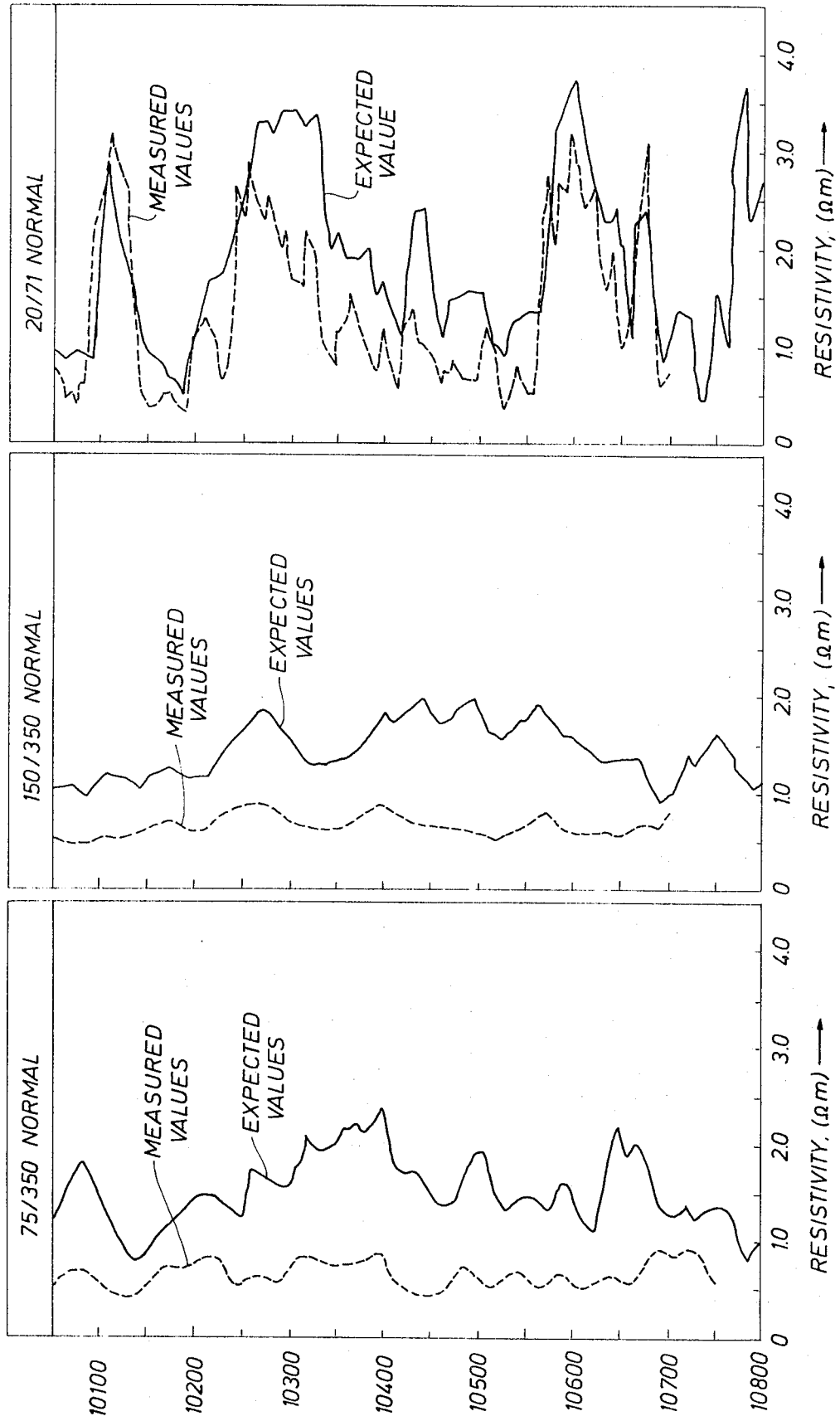
FIG. 7 is a plot of the expected and measured resistivity in an actual well.
Figure 8:
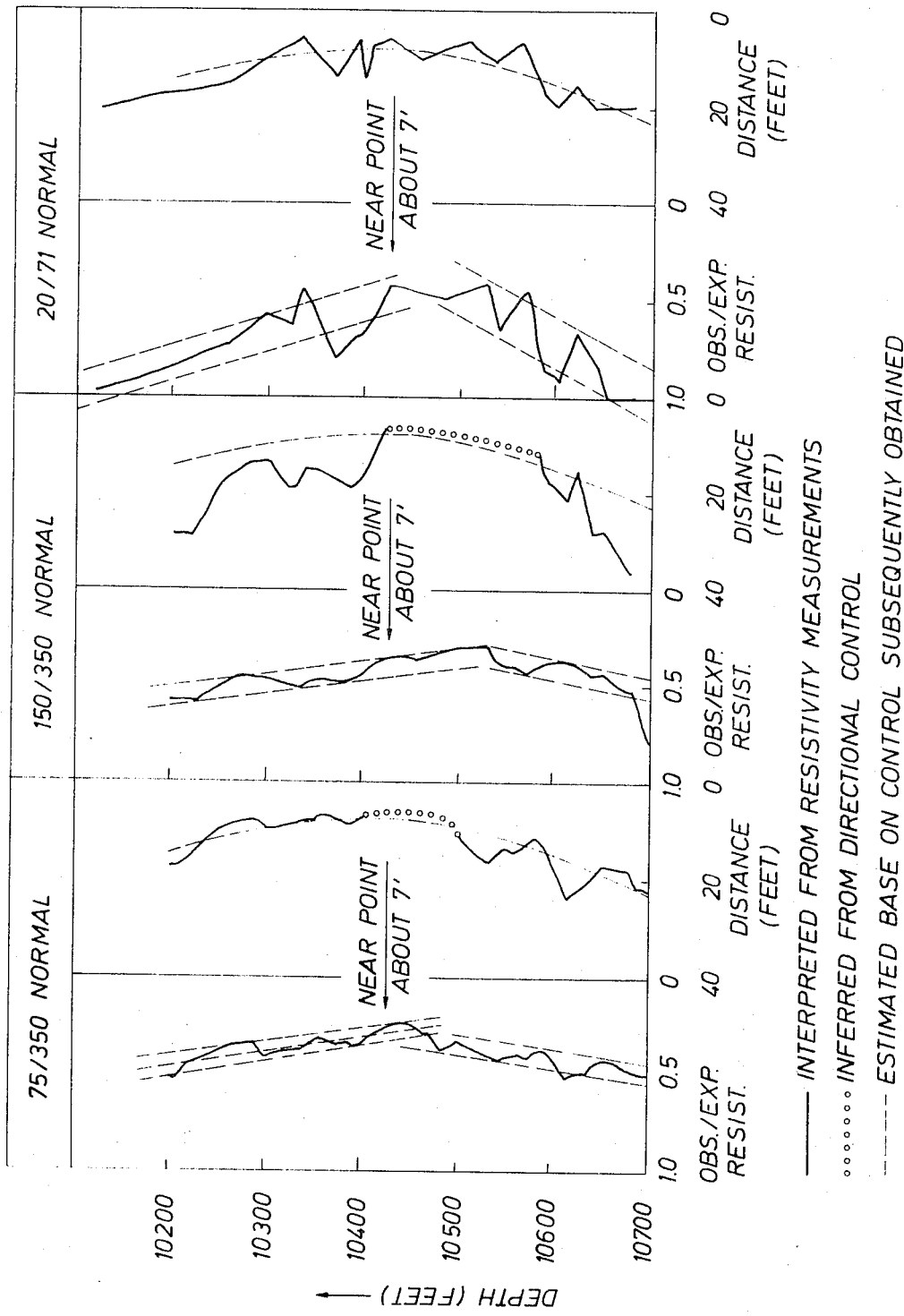
FIG. 8 is a plot of the reduction in the resistivity and the corresponding distance between the two wells for the data shown in FIG. 7 using the nomogrphas shown in FIGS. 3 and 6.

Referring to FIGS. 7 and 8 there is shown the actual results obtained using the method of the present invention to locate a cased well from an open well. More particularly, FIG. 7 are the resistivity logs obtained using various logging configurations for the depth interval 10100 to 10800. Also plotted are the expected resistivity values. In FIG. 8 there is shown a plot of the ratio of the observed resistivity to the estimated resistivity for the three logging devices shown in FIG. 7. Various procedures are available for calculating the expected response of various configurations of resistivity tools in formtions having various resistivities. These procedures are used to calculate the expected resistivity values shown in FIGS. 7 and 8. Also shown is a plot of the distance between the open and the cased wells utilizing the nomographs shown in FIGS. 3–6. As can be seen from FIG. 8, the 20-foot normal resistivity tool provides a much sharper indication of the near point of the two wells than either the 75-ft. or the 150-ft. resistivity logging tools. This results from the fact that the depth of investigation of the long interval tools is much greater than the short interval tool. Thus the long interval tool responds to the presence of the casing at a greater range but the response is more gradual than the short interval tool. This is illustrated in FIGS. 4 and 5 where the 20-ft. normal log is affected very little by changes in the vertical angle and formation resistivity while the 150/600 is affected to a considerable extent.

While a number of nomographs are required if wells are drilled in a large number of areas, only a few are required for a particular set of wells. For a particular pair of wells the casing size, vertical angle and formation resistivity will remain relative constant and only a few nomographs will be required.

We claim:
1. A method for determining the distance between a cased well and an open well comprising:
- determining from prior measurements the normal formation resistivity that would be measured in the open well at various depth points in the absence of the cased well;
- calculating by a machine process, using the resistivity of the casing, the determined normal formation resistivity and assumed distances between the two wells, the reduction in the normal resistivity resulting from the presence of the casing for each of the assumed distances;
- producing a nomograph by plotting the calculated reduction in the normal resistivity with respect to the assumed distances between the two wells;
- measuring the resistivity in the open well at various depth points;
- determining the difference between the previously determined normal resistivity and the measured resistivity at said various depth points to obtain the actual reduction in normal resistivity; and
- using the actual reduction in the normal resistivity and nomogram to obtain the distance between the open and cased wells.

2. The method of claim 1 wherein the normal resistivity and reduction in resistivity are made using resistivity measurements made in the cased well prior to installation of casing therein.

3. The method of claim 1 wherein a series of nomographs are prepared using various inclinations of the open well with respect to the cased well.

4. The method of claim 1 wherein a series of nomographs are prepared with the inclination between the cased and open wells varying between 0° and 15° and the resistivity varying between 1 and 5 ohm meters.

5. The method of claim 1 wherein the resitivity measurements are made using relatively long electrode spacings when the wells are more than 20 feet apart and the resistivity measurements are made using shorter electrode spacings when the wells are less than 20 feet apart.

6. The method of claim 1 wherein the nomographs are prepared using various assumed casing sizes.

7. The method of claim 1 wherein the nomographs are prepared using various assumed closest points between the cased and open wells.

8. The method of claim 1 wherein the nomographs are prepared using a combination of assumed casing size, near point, formation resistivity and inclination between the cased and open wells.

* * * * *